United States Patent [19]

Binning et al.

[11] Patent Number: 4,566,838
[45] Date of Patent: Jan. 28, 1986

[54] ACCUMULATOR PAN TRANSFER DEVICE

[75] Inventors: Ronald L. Binning, St. Petersburg; Burton C. Sieder, Clearwater, both of Fla.

[73] Assignee: Intech Systems, Inc., Hampton, Va.

[21] Appl. No.: 521,947

[22] Filed: Aug. 10, 1983

[51] Int. Cl.$^4$ .............................................. B65G 1/04
[52] U.S. Cl. .................................. 414/278; 414/282; 414/286; 414/659; 414/663
[58] Field of Search ............... 414/277, 278, 280, 286, 414/662, 663, 607, 659, 660, 661, 281, 282; 198/463, 457, 371, 366, 611

[56] References Cited

U.S. PATENT DOCUMENTS

| | | |
|---|---|---|
| 859,850 | 7/1907 | Sliga . |
| 2,298,577 | 10/1942 | McPhail . |
| 2,688,420 | 9/1954 | Bishop et al. . |
| 3,439,815 | 4/1969 | Wagner et al. ................. 414/277 X |
| 3,473,675 | 10/1969 | Goldammer et al. . |
| 3,606,039 | 9/1971 | Weston et al. ...................... 414/283 |
| 3,674,159 | 7/1972 | Lemelson ......................... 414/278 X |
| 3,883,008 | 5/1975 | Castaldi . |
| 4,240,540 | 12/1980 | Hobbs et al. . |
| 4,279,337 | 7/1981 | Kachnik .......................... 104/165 X |
| 4,492,504 | 1/1985 | Hainsworth .................... 414/278 X |
| 4,529,081 | 7/1985 | Tanaka ............................. 414/278 X |

Primary Examiner—Robert J. Spar
Assistant Examiner—Stuart J. Millman
Attorney, Agent, or Firm—Michael Sand Co.

[57] ABSTRACT

A device for transferring article storage pans between a selected storage compartment and shuttle which moves along the aisles of storage racks in a warehouse. The accumulator pan transfer device is vertically, movably mounted on the shuttle. An extractor carriage has a plurality of spaced cogged rollers and moves horizontally and upwardly on wheels located in V-shaped guides mounted on a horizontal base for engagement with a pan which is to be transferred between the device and a storage compartment. Certain of the cogged rollers are power driven and engage a series of projections formed on the bottom wall of the pan to remove the pan from the compartment and onto other of the supporting rollers for supporting the pan as it is transferred to the center of the base. Return of the extractor carriage to the center of the base deposits the removed pan onto a pair of transversely extending accumulator belts. The belts are power driven and remove the pan from the extractor. Additional pans can be removed and accumulated on the accumulator belts before the shuttle is returned to a home position. Reversing the accumulator belt drive will move the stored pans individually back onto the extractor carriage rollers which will return the pans to their storage positions upon actuation of the power driven cogged rollers. The pans include a shallow tray formed of plastic or stamped metal and are provided with a series of projections along the bottom thereof for engagement by the cogged extractor rollers. A cardboard or plastic box is removably secured on the tray by tangs which are formed on and project from the side walls of the tray.

20 Claims, 14 Drawing Figures

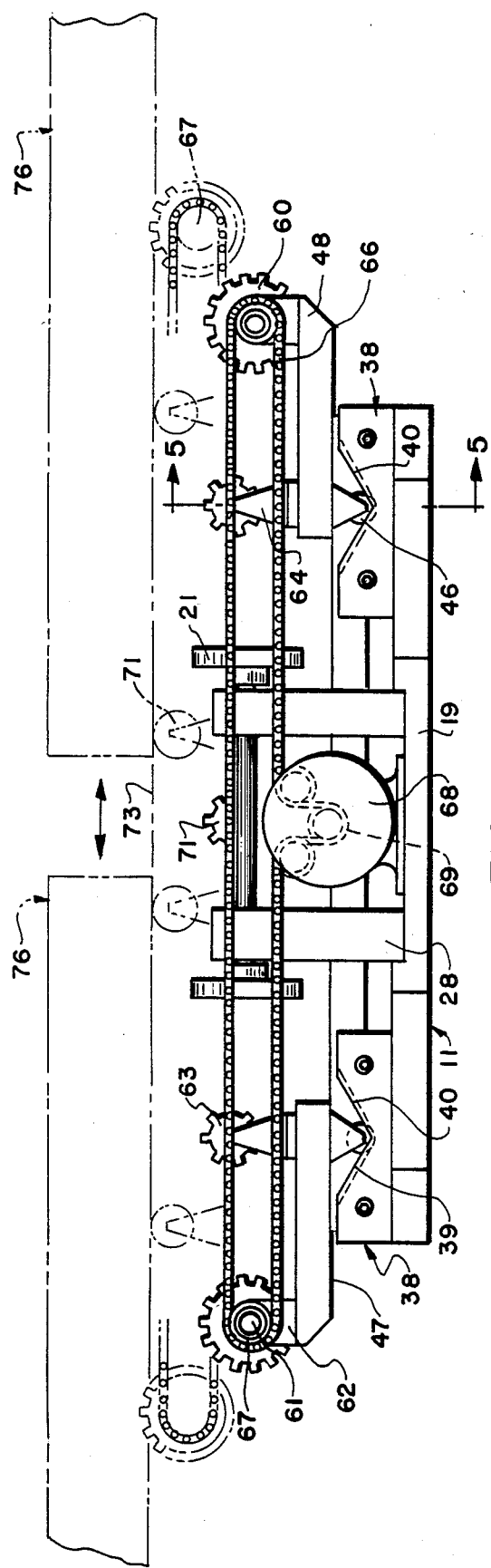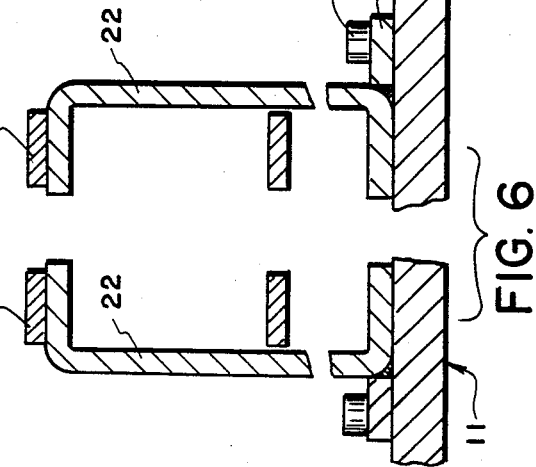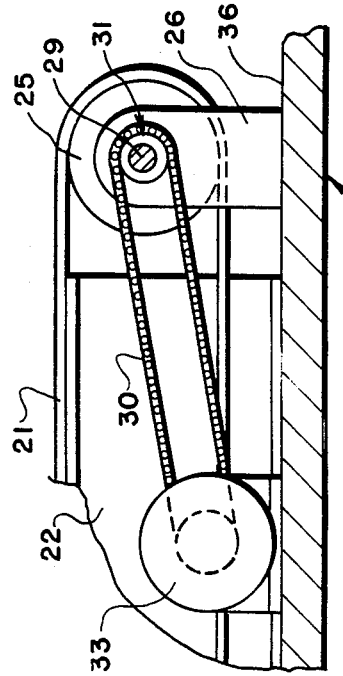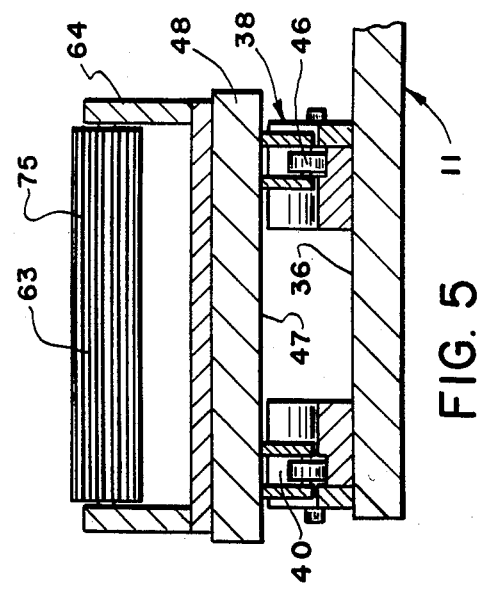

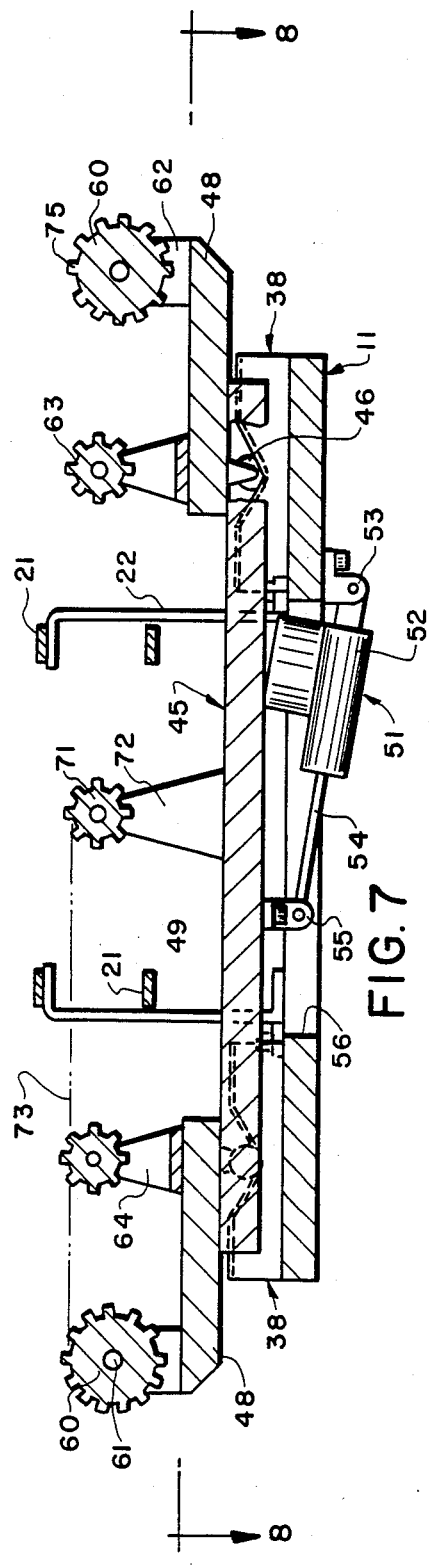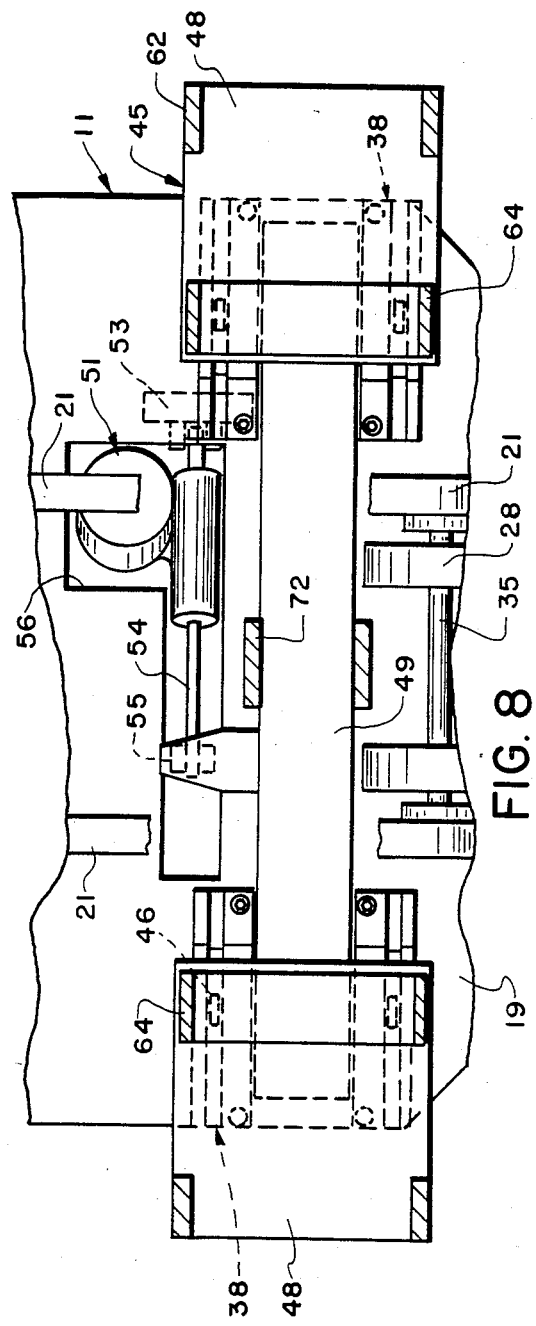

ACCUMULATOR PAN TRANSFER DEVICE

TECHNICAL FIELD

The invention relates to a device for automatically transferring article storage pans between a selected storage compartment in a warehouse rack and a shuttle mechanism for subsequent movement to a predetermined location, and particularly to such a transfer device on which a plurality of pans can be accumulated while other pans are being transferred between the device and a storage compartment.

BACKGROUND ART

Numerous mechanisms have been used in automatic warehouses for transferring pans or articles between a selected storage compartment in a storage unit containing a number of such racks and compartments and an elevator mechanism or shuttle which carries the pan or article to a predetermined location. These retrieval or extractor devices use various mechanisms for engaging the pan and for moving the pan between the storage compartment and elevator. For example, certain retrievers use an electromagnet which clamps onto a metal pan or plate attached to the pan whereas other retrievers use a pneumatic or suction cup device for grasping the pan. Still other devices use a mechanical arm or latch which mechanically engages a bracket or flange mounted on the front wall of the pan. Certain other types of pan transfer devices use pins mounted on chains or rams which engage the pan for transferring the same between the elevator and storage compartment.

Although many of these prior transfer devices perform satisfactorily, certain problems can be encountered during their use. For example, unless some mechanism is provided for moving the pan extractor horizontally on the elevator to a position closely adjacent the pan, extremely close tolerances must be maintained between the elevator and storage racks and pan stored therein. This close tolerance requirement throughout the entire warehouse system is difficult to maintain and should only one pan or rack be out of alignment a small amount, serious problems and equipment damage can result.

Another problem is that most retrieval devices will only hold one pan or load at any one time requiring the shuttle to return all the way to a home position for discharging the retracted pan before returning to the warehouse for retrieval of a second pan. Depending upon the size of the warehouse installation, this requires the shuttle to travel a considerable distance each time. Likewise, the shuttle must retrace its path many times in performing pan transfer functions.

Another problem is that the article storage pans used in automatic warehouse systems are generally formed of rigid expensive metal components to ensure long life due to their repeated handling by the transfer device and personnel at a load control station in the warehouse. Such pan replacement is expensive and increases the cost of the warehouse operation. Even though only a small part of the pan may be bent or damaged, it will require replacement of the entire pan.

Accordingly the need has existed for an improved pan transfer device for use in moving a storage pan between a storage compartment and a shuttle in which a plurality of pans may be accumulated on the shuttle during movement of the shuttle, in which the transfer device is moved horizontally toward and away from the storage compartment when transferring a pan between the elevator and storage compartment thereby eliminating the heretofore close tolerances between the elevator and storage racks; and in which an inexpensive pan can be used with the improved transfer device.

DISCLOSURE OF THE INVENTION

Objectives of the invention include providing an improved pan transfer device for use in automatic warehouses in which the device has a base which moves vertically along a transfer crane or shuttle car for transferring an article storage pan between a selected storage position and a transfer station for removal or placement of articles from and into the pan. Another objective is to provide such an improved transfer device in which a carriage is movably mounted on the front end of the base and moves upwardly and horizontally toward a selected storage pan located in the storage racks; in which the carriage is mounted on wheels which move along V-shaped guide tracks; and in which a plurality of cogged wheels are mounted on the top surface of the carriage, the end ones of which are power driven for transferring a storage pan between the rack and carriage.

A still further objective of the invention is to provide such a pan transfer device in which a pair of accumulator belts extend along the base transversely to the direction of movement of the carriage for storing and accumulating a plurality of storage pans, enabling the transfer device to retrieve a plurality of pans from the warehouse before returning the same to a central station, and conversely which enables a plurality of pans to be returned from the central station to storage compartments in the warehouse eliminating excessive travel of the shuttle car.

Another objective is to provide such an improved pan transfer device in which the pans used with the device consist of a relatively shallow tray formed of a rigid plastic or stamped metal with a replaceable article storage container or box removably mounted thereon; and in which the box is formed inexpensively of plastic, cardboard or similar material and is removably held on the tray by tangs formed integrally with the tray wall. A further objective is to provide such a transfer device in which the improved pan therefor has a plurality of projections formed along the bottom wall of the pan, which projections are complementary to the cogs of the extractor roller, thereby providing a positive engagement between the extractor roller and pan for transferring the pan between the carriage and storage compartment. Another objective is to provide such an improved pan construction in which the box or container portion thereof can be formed extremely inexpensively enabling the same to be replaced should it become damaged without replacing the supporting tray portion thereof, thereby reducing container costs for the warehouse system.

These objectives and advantages are obtained by the improved pan transfer system for a warehouse of the type having a shuttle movable along an aisle adjacent a storage rack having a plurality of storage compartments formed therein, and in which the general nature of the system may be stated as including pan means for containing stored articles adapted to be removably located in one of the storage compartments; a base vertically movably mounted on the shuttle; accumulator belt means mounted on the base for movement in a horizontal plane for transferring and accumulating a plurality of the pan means on said base; extractor means movably mounted on the base for individually transferring pan means between a storage compartment and the accumulator belt means; and drive means for moving the extractor means toward and away from a storage compartment.

BRIEF DESCRIPTION OF THE DRAWINGS

A preferred embodiment, illustrative of the best mode in which applicants have contemplated applying the principles, is set forth in the following description and is shown in the drawings and is particularly and distinctly pointed out and set forth in the appended claims.

FIG. 4 is an enlarged end elevational view looking in the direction of arrows 4—4, FIG. 3, with the carriage rollers shown in dot-dash lines in raised operative position transferring storage containers;

FIG. 5 is an enlarged fragmentary sectional view taken on line 5—5, FIG. 4;

FIG. 6 is an enlarged fragmentary sectional view taken on line 6—6, FIG. 3;

FIG. 7 is an enlarged fragmentary sectional view with portions broken away taken on line 7—7, FIG. 3, showing the base, carriage and drive motor therefor;

FIG. 8 is a fragmentary sectional view taken on line 8—8, FIG. 7;

FIG. 9 is an enlarged fragmentary sectional view taken on line 9—9, FIG. 3 showing the accumulator belt drive motor;

Similar numerals refer to similar parts throughout the drawings.

BEST MODE FOR CARRYING OUT THE INVENTION

Figure 1:
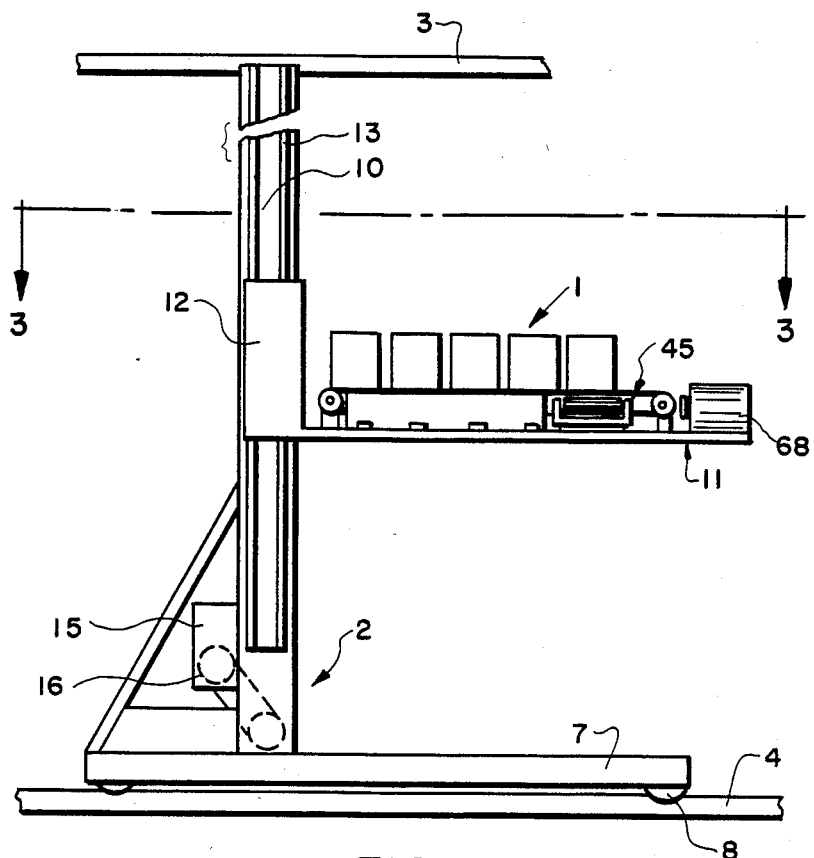
FIG. 1 is a diagrammatic side elevational view showing the improved accumulator pan transfer device mounted on a shuttle with a plurality of pans located thereon.
Figure 2:
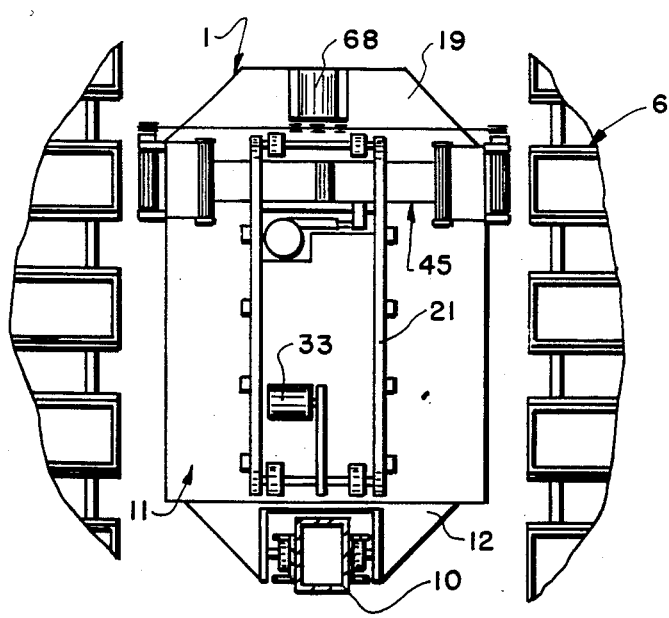
FIG. 2 is a diagrammatic top plan view of FIG. 1 showing the pan transfer device and shuttle located in an aisle formed by a pair of spaced storage racks shown in fragmentary form.

FIGS. 1 and 2 are perspective diagrammatic views showing the improved accumulator pan transfer device which is indicated generally at 1, mounted for vertical movement on a shuttle indicated generally at 2. Shuttle car 2 is shown as being the type which is movable on a pair of upper and lower rails 3 and 4 which are located between each aisle formed by storage racks 6. Racks 6 are arranged on both sides of the aisles and of rails 3 and 4, and preferably are formed by spaced L-shaped channels 5. Portions of storage racks 6 are shown on both sides of shuttle car 2 and of transfer device 1 in FIG. 2. Shuttle car 2 may include a base 7 mounted on wheels 8 which are movably engaged with lower rail 4 for movement therealong. Shuttle car 2 further includes a vertical mast 10 which extends upwardly from base 7, terminating adjacent top rail 3 and including wheels (not shown) which movably engage rail 3.

Figure 3:
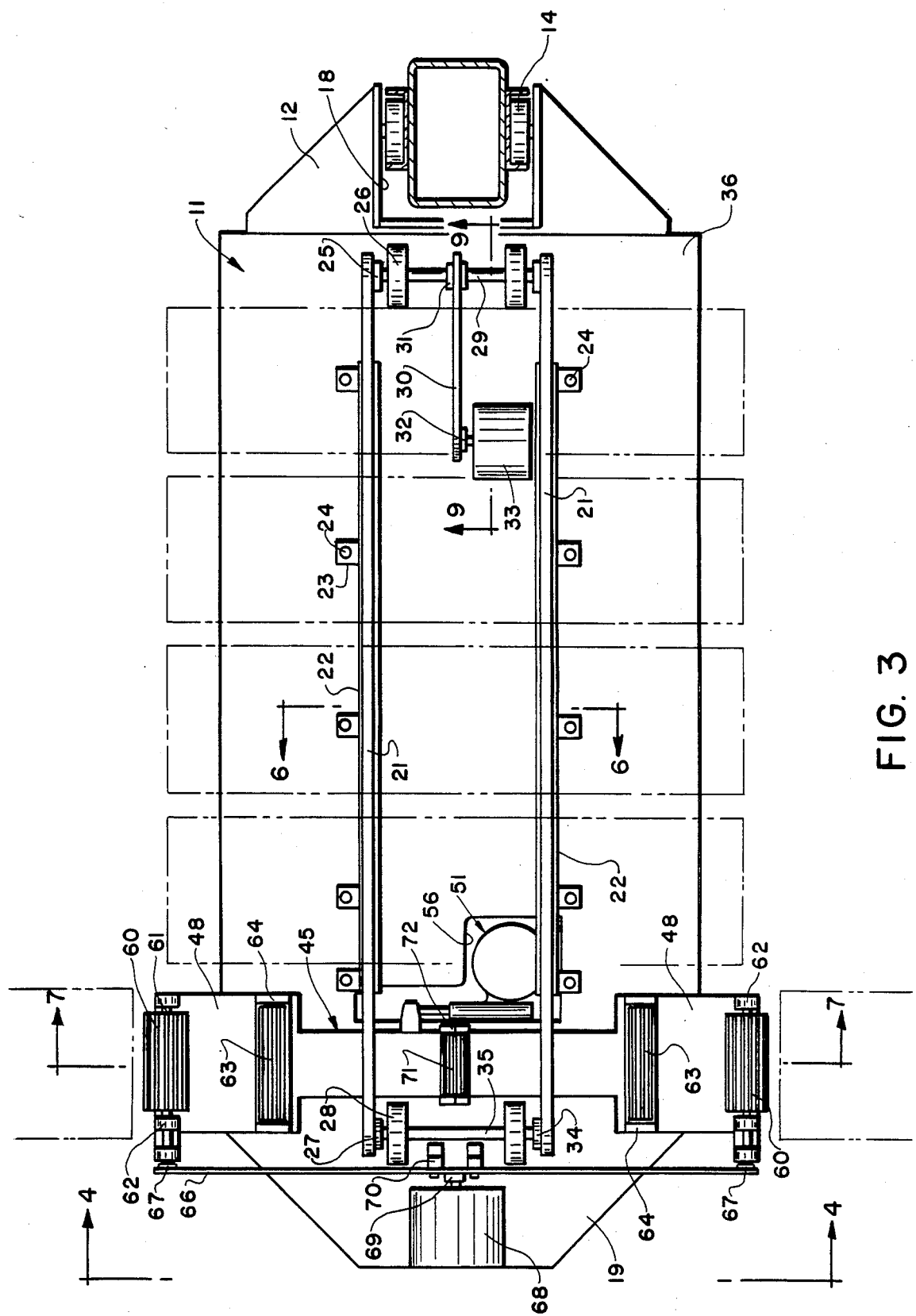
FIG. 3 is an enlarged sectional view of the improved pan transfer device taken on line 3—3, FIG. 1, with four storage pans shown in dot-dash lines being accumulated thereon.

Transfer device 1 preferably has an L-shaped configuration and includes a horizontal base 11 and a vertical slide frame 12. Device 1 is slidably mounted on mast 10 by wheels 14 which are movably engaged in rails 13 which extend along vertical mast 10 of shuttle 2 (FIG. 3). Wheels 14 are mounted on slide frame 12 within a rectangular-shaped cutout portion 18 formed therein. Base 11 extends in cantilever fashion outwardly from vertical slide frame 12 and terminates in a truncated-shaped motor mounting plate 19 at the extended or front end thereof. Shuttle 2 is moved along rails 3 and 4 by a motor 15 and drive mechanism 16 or other drive arrangements. Likewise, transfer device 1 is vertically movable along mast 10 by appropriate power drive equipment (not shown).

Transfer device 1 may be used with other types of transfer mechanisms than the type of shuttle car 2 which is shown in the drawings. Shuttle 2 may be of the type controlled automatically from a remote operator station by a computer or other type of automatic control equipment, or may be controlled by an operator positioned on a platform which forms part of the shuttle car.

A pair of endless accumulator belts 21 (FIGS. 3, 6 and 9) are supported by U-shaped channels 22 which are mounted on base 11 by clamps 23 and bolts 24 and extend generally throughout the longitudinal length of base 11. Belts 21 are rotatably mounted at the inner end of base 11 on a pair of spaced drive sprockets 25 which are mounted on the ends of a shaft 29 which is rotatably supported by bearings 26, and at the extended end of base 11 by a pair of spaced driven sprockets 27. Sprockets 27 are mounted on the end of a shaft 35 rotatably supported by spaced bearings 28. Drive sprocket shaft 29 is driven by a chain 30 which extends about a sprocket 31 mounted on shaft 29 and about a drive belt sprocket 32 connected to the shaft of a drive motor 33 which is mounted on base 11 (FIG. 9).

Two pairs of spaced guide tracks, each of which is indicated generally at 38 (FIGS. 4, 5 and 8) are mounted on top surface 36 of base 11 adjacent the extended end thereof. Each guide track 38 is formed by converging sloped surfaces 39 and 40, preferably having an angle of approximately 30° with respect to horizontal top surface 36 of base 11. Guide tracks 38 are attached by bolts or other fastening means to base 11 and project upwardly from top surface 36.

A carriage indicated generally at 45, is movably mounted on the front end of base 11 by a plurality of wheels 46 which are movable along guide tracks 38. Four wheels 46 are mounted on bottom surface 47 of carriage 45 and extend downwardly therefrom, each of which is engaged in a respective guide track 38. Carriage 45 (FIGS. 7 and 8) includes a pair of rectangular-shaped end platforms 48 which are connected by an intermediate support plate 49. Carriage 45 is movable with respect to base 11 by an electric shift motor 51 whose case 52 is attached to base 11 by a clevis block 53 which permits the motor case to pivot with respect to the base. Shaft 54 of shift motor 51 is attached to carriage 45 by a second clevis block 55 which permits the shaft to pivot with respect to the carriage. Motor 51 is located within a cutout area 56 formed in base 11.

An extractor roller 60 (FIGS. 3, 4 and 7) is mounted at the outer end of each platform 48 of carriage 45 by a shaft 61 which is rotatably supported by a pair of spaced bearing brackets 62. A pan support idler roller 63 is rotatably mounted on a bracket 64 adjacent the inner end of each carriage platform 48. Extractor rollers 60 are power driven by an endless extractor chain 66 which extends about a pair of sprocket 67 firmly mounted on the ends of extractor roller shafts 61. Extractor chain 66 is driven by a motor 68 through a drive sprocket 69 in combination with a pair of tensioning sprockets 70. An intermediate pan support idler roller 71 is rotatably mounted on a bracket 72 which is attached to and located generally at the midpoint of intermediate support plate 49 between end platforms 48 of carriage 45. Extractor rollers 60, idler rollers 63 and intermediate idler roller 71 are mounted on platform 45 whereby an imaginary line tangent to the top surfaces thereof forms a horizontal plane 73 as shown in FIG. 4.

In accordance with one of the features of the invention, extractor rollers 60 are formed with cogged outer surfaces having a plurality of equally spaced cogs 75. Cogs 75 preferably have a rectangular cross-sectional configuration and extend longitudinally throughout the surfaces of extractor rollers 60. Intermediate rollers 63 and 71 also may be cogged as shown in the drawings.

Transfer device 1 is intended for use in an automatic warehouse system of the type using article storage pans such as shown in FIGS. 10–14, although it need not be limited to such a pan construction. The improved article storage pan is indicated generally at 76, and includes a shallow tray 77 which may be molded of plastic or stamped inexpensively of sheet steel having a bottom wall 78 and integral upstanding sidewalls 79.

Figure 10:
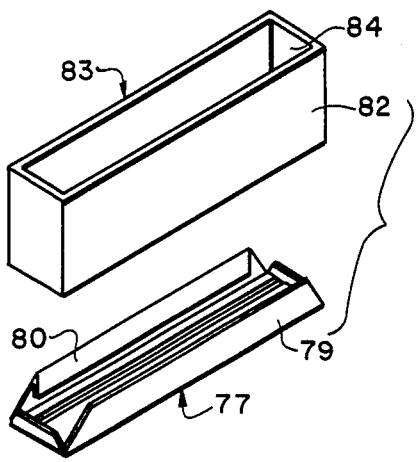
FIG. 10 is a perspective view of one of the storage pans in exploded condition.
Figure 11:
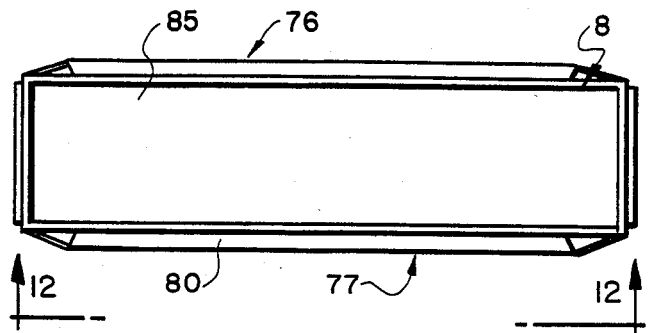
FIG. 11 is an enlarged top plan view of the pan construction of FIG. 10 in assembled condition.
Figure 13:
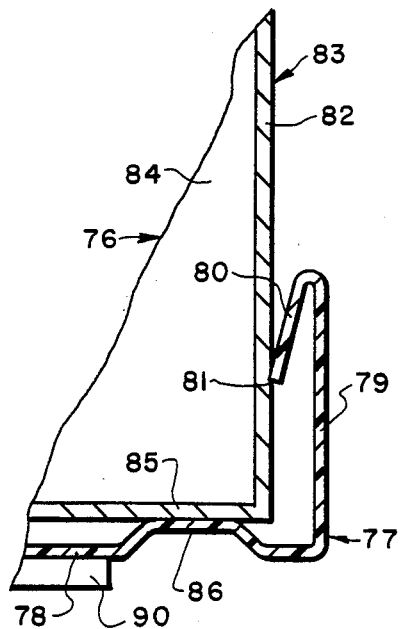
FIG. 13 is an enlarged fragmentary sectional view taken on line 13—13, FIG. 12.

In accordance with one of the features of improved storage pan 76, sidewalls 79 terminate in downwardly inwardly extending tangs 80 (FIG. 13). Tangs 80 preferably will have a relatively sharp edge or corner 81 which will bite into and grip the sidewalls 82 of an article carrying box indicated generally at 83, adapted to be removably mounted on tray 77 (FIGS. 10 and 13). Box 83 has a rectangular configuration as shown in FIG. 10 and is formed of plastic, cardboard or similar inexpensive material having side walls 82, end walls 84 and a bottom wall 85. Bottom wall 78 of tray 77 may be formed with a pair of upwardly projecting ridges 86 (FIG. 13) on which bottom wall 85 of box 83 is supported when box 83 is removably mounted and retained on tray 77 by tangs 80.

Figure 12:
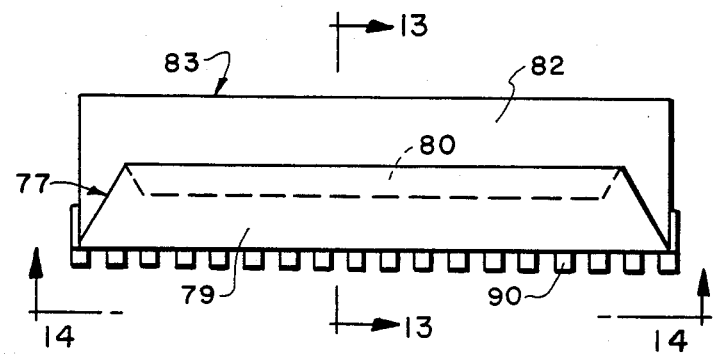
FIG. 12 is a side elevational view of the improved pan construction looking in the direction of arrows 12—12, FIG 11.
Figure 14:
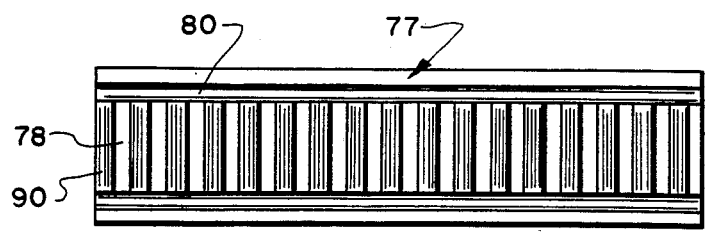
FIG. 14 is a bottom plan view of the improved pan construction looking in the direction of arrows 14—14, FIG. 12.

In accordance with another feature of pan 76 is the formation of a plurality of projections 90 on bottom wall 78 of tray 77. Projections 90 preferably are formed integral with bottom wall 78 and project downwardly therefrom (FIGS. 12 and 14). Projections 90 are configured so as to be complementary with cogs 75 of extractor rollers 60, 63 and 71, and preferably extend throughout the length of bottom tray wall 78.

Pan 76 provides a very inexpensive construction having a relatively permanent tray 77 formed inexpensively of sheet metal or rigid plastic with replaceable article storage boxes 83 adapted to be removably mounted and secured thereon by tangs 80. Thus, throughout the life of a pan 76, box 83 may become damaged and require periodic replacement without necessitating replacement of the entire article storage pan as heretofore required in prior pan constructions. Likewise, box 83 may be of various vertical heights, configurations and types without requiring modification of the entire box construction, thereby providing greater versatility to the pan and warehousing system in which the pans are used.

The operation of improved pan transfer device 1 is as follows. Prior to pan transfer device 1 performing a retrieve function, device 1 is positioned by shuttle 2 adjacent to a designated storage container in rack 6. Extractor carriage 45 will be in the "home" position such as shown in full lines in FIGS. 3 and 4. Electric shift motor shaft 54 will be at the midpoint of its travel. A retrieve command is received from the associated control equipment which may be of various configurations and types readily available for use in automatic warehouse systems. The appropriate signal actuates shift motor 51 causing shaft 54 to extend or retract from its midpoint position depending upon the direction that carriage 45 is to take, which depends upon the particular side of the aisle in which the desired pan 76 is located. Movement of shaft 54 will drive carriage 45 up one side of the guide tracks 38 toward an extended position as shown by dot-dash representations of rollers 60, 63 and 71 in FIG. 4. This movement raises the carriage 45 upwardly and in a horizontal direction to a position closely adjacent the selected pan. This movement also will raise the horizontal plane 73 defined by the tops of rollers 60, 63 and 71 above the accumulator belts 21.

As carriage 45 reaches the end of its travel, one of the cog extractor rollers 60 will engage the frontmost projection 90 of tray 77. Engagement of projection 90 by extractor roller 60 will force the end of tray 77 up and slightly onto the extractor roller when carriage 45 reaches the end of its travel. A command from the control equipment actuates extractor drive motor 68 which drives extractor rollers 60 through chain 66 and sprockets 67. The driven cog extractor roller 60 will retract engaged tray 77 and box 83 mounted thereon from its storage compartment and onto carriage idler, rollers 63 and 71 which support retrieved article storage pan 76 as it is being retracted, maintaining clearance above accumulator belts 21 (FIG. 4). Upon pan 76 reaching a midpoint position on the center of carriage 45, a command turns off extractor drive motor 68 followed by another command which actuates shift motor 51. Motor 51 drives carriage 45 down the sides of guide tracks 38 to the home position in which carriage wheels 46 are at the bottom of their associated guide tracks. This downward movement of carriage 45 will deposit pan 76 on the base mounted accumulator belts 21 completing the retrieve function.

Accumulator belt drive motor 33 then is energized, rotating drive chain 30 and correspondingly belts 21 which will move pan 76, which is now supported by belts 21, rearwardly along base 11 and away from carriage 45. Motor 33 will be de-energized as soon as pan 76 has moved one position rearwardly along belts 21. Subsequent pans 76 are accumulated in the same manner until all four accumulator positions are occupied. A fifth pan remains on the carriage providing a total capacity of five pans on transfer device 1.

To restore or return a pan 76 into a desired storage compartment in rack 6, the pan is centered on carriage 45 supported by accumulator belts 21. Shuttle 2 moves transfer device 1 to adjacent the desired storage compartment. A restore command then energizes shift motor 51 causing shaft 54 to extend or retract from its midpoint position which drives carriage 45 up one side of guide tracks 38 toward the desired storage compartment. This upward and horizontal movement of carriage 45 raises the carriage and correspondingly horizontal plane 73 defined by the carriage rollers above accumulator belts 21, picking the pan up as the carriage moves. A command then energizes extractor drive motor 68 which drives cogged extractor rollers 60 transferring the pan into the storage compartment. When the transfer is complete, a command runs shift motor 51 driving carriage 45 away from the storage compartment which drops the pan edge onto the storage compartment support channels 5. The extractor drive chain motor 68 continues running the cogged rollers 60 until carriage 45 reaches its home position to ensure disengagement from the projections 90 of tray bottom wall 78.

The extractor carriage 45 then is driven back to its home position cleared for the next pan 76 on accumulator belts 21 to be shifted forwardly by the belts onto carriage 45 for the next restore function. Upon the empty extractor carriage 45 reaching its home position, a command will start accumulator belt motor 33 moving the pan occupying the first accumulator position into the carriage zone above carriage 45. The command to accumulator belt motor 33 is removed when the pan occupies the position above carriage 45. When device 1 is positioned by shuttle 2 adjacent to the next storage compartment to be loaded, a command runs the electric shift motor 51 driving carriage 45 up one side of guide tracks 38 repeating the restore function operation described above.

Accordingly, the improved accumulator pan transfer device is simplified, provides an effective, safe, inexpensive, and efficient construction which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved accumulator pan transfer device is constructed and used, the characteristics of the construction, and the advantageous, new and useful results obtained; the new and useful structures, devices, elements, arrangements, parts, and combinations, are set forth in the appended claims.

What is claimed is:

1. An improved pan transfer system for a warehouse of the type having a shuttle movable along an aisle adjacent a storage rack having a plurality of storage compartments formed therein, said system including:

(a) pan means for containing stored articles adapted to be removably located in one of the storage compartments;
    (b) a base vertically movably mounted on the shuttle;
    (c) accumulated belt means mounted on the base for movement in a horizontal plane for transferring and accumulating a plurality of the pan means on said base;
    (d) extractor means movably mounted on the base by wheels for individually transferring pan means between a storage compartment and the accumulator belt means; and
    (e) drive means for moving the extractor means toward and away from a storage compartment, said drive means including guide tracks having V-shaped configurations mounted on the base and reversible motor means for moving the extractor means along the guide tracks toward and away from the storage compartment by the wheels which move in said guide tracks.

2. The system defined in claim 1 in which the accumulator belt means includes a pair of endless belts extending transversely to the direction of movement of the extractor means.

3. The system defined in claim 1 in which the extractor means includes a carriage which is movably mounted in the guide tracks by the wheels; in which a plurality of roller means are mounted on the carriage engageable with the pan means for transferring the pan means between the storage compartment and the belt means; and in which certain of said rollers have a cogged outer surface which is adapted to engage complementary-shaped projections formed on the pan means.

4. The system defined in claim 3 in which the roller means further includes additional support rollers mounted on the carriage and spaced from the cogged rollers to provide additional support for a pan means when moving the pan means between the accumulator belt means and storage compartment.

5. The system defined in claim 3 in which the roller means includes two spaced cogged rollers located adjacent the outer ends of the carriage and three intermediate rollers mounted in a spaced relationship on the carriage between the outer cogged rollers.

6. The system defined in claim 5 in which the three intermediate rollers are freely rotatably mounted on the carriage.

7. The system defined in claim 5 in which the two spaced outer cogged rollers are power driven by an endless extractor chain and chain drive motor.

8. The system defined in claim 1 in which the V-shaped guide tracks are formed by converging pairs of sloped surfaces having angles of approximately 30° with respect to the plane of the base.

9. The system defined in claim 1 in which the motor means is an electric-shift motor having a case pivotally mounted on the base and a shaft pivotally connected to the extractor means.

10. The system defined in claim 2 in which accumulator belts are supported on a pair of channels mounted on the base.

11. The system defined in claim 1 in which the base extends in a cantilever fashion from the shuttle; and in which the extractor means is located adjacent the extended end of the base and extends transversely with respect to the longitudinal axis of the base.

12. The system defined in claim 1 in which the pan means includes a shallow tray having tangs formed thereon, and a box removably mounted on the tray for storing articles; and in which the box is retained on the tray by the tangs.

13. The system defined in claim 12 in which the tray has a bottom wall; and in which a series of projections are formed on the tray bottom wall and are engageable by the roller means for transferring the pan means between a storage compartment and the belt means.

14. The system defined in claim 1 in which the extractor means includes cogged roller means; in which the pan means includes an article storage pan; and in which projection means is formed on the pan and is engageable by the cogged roller means for transferring the pan between the storage compartment and accumulator belts.

15. An improved pan transfer system for a warehouse of the type having a shuttle movable along an aisle adjacent a storage rack having a plurality of storage compartments formed therein, said system including:
   (a) pan means for containing stored articles adapted to be removably located in one of the storage compartments;
   (b) a base vertically movably mounted on the shuttle;
   (c) accumulator belt means mounted on the base for movement in a horizontal plane for transferring and accumulating a plurality of the pan means on said base;
   (d) extractor means movably mounted on the base for individually transferring pan means between a storage compartment and the accumulator belt means, said extractor means including a carriage containing a plurality of roller means; and
   (e) drive means for moving the extractor means horizontally and vertically with respect to the base toward and away from a storage compartment and for rotating the roller means whereby said roller means engage the pan means and transfers the pan means between the storage compartment and the carriage, and for transferring the pan means between the carriage and the accumulator belt means with said accumulator belt means being movable in a horizontal plane transverse to the direction of movement of the carriage.

16. The system defined in claim 15 in which the drive means for moving the extractor means toward and away from a storage compartment includes guide tracks mounted on the base and reversible motor means for moving the extractor means along the guide tracks toward and away from the storage compartment.

17. The system defined in claim 16 in which the guide tracks have V-shaped configurations; in which the carriage is movably mounted on wheels which move in the guide tracks; and in which certain of the carriage rollers have a cogged outer surface which is adapted to engage complementary-shaped projections formed on the pan means.

18. The system defined in claim 17 in which the roller means further includes additional support rollers mounted on the carriage and spaced from the cogged rollers to provide additional support for a pan means when moving the pan means between the accumulator belt means and storage compartment.

19. The system defined in claim 18 in which the roller means includes two spaced cogged rollers located adjacent the outer ends of the carriage and three intermediate rollers mounted in a spaced relationship on the carriage between the outer cogged rollers; in which the three intermediate rollers are freely rotatably mounted on the carriage; and in which the two spaced outer cogged rollers are power driven by an endless extractor chain and chain drive motor.

20. The system defined in claim 16 in which the motor means is an electric-shift motor having a case pivotally mounted on the base and a shaft pivotally connected to the extractor means.

* * * * *